United States Patent
Tsuchiya

(10) Patent No.: US 10,414,589 B2
(45) Date of Patent: Sep. 17, 2019

(54) BATTERY ALIGNING DEVICE

(71) Applicant: FDK CORPORATION, Tokyo (JP)

(72) Inventor: Katsuki Tsuchiya, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 16/191,217

(22) Filed: Nov. 14, 2018

(65) Prior Publication Data

US 2019/0144207 A1    May 16, 2019

(30) Foreign Application Priority Data

Nov. 14, 2017    (JP) ................. 2017-219277

(51) Int. Cl.
| | | |
|---|---|---|
| *B65G 11/20* | (2006.01) | |
| *H01M 10/42* | (2006.01) | |
| *B65G 47/44* | (2006.01) | |
| *H01M 6/50* | (2006.01) | |
| *H01M 10/44* | (2006.01) | |

(52) U.S. Cl.
CPC ............ *B65G 11/203* (2013.01); *B65G 47/44* (2013.01); *H01M 6/5011* (2013.01); *H01M 10/4207* (2013.01); *H01M 10/44* (2013.01)

(58) Field of Classification Search
CPC ........ B65G 47/44; B65G 47/24; B65G 11/20; B65G 11/203; H01M 10/4207; H01M 10/42; H01M 10/64; H01M 10/643; B07B 1/00; B07B 1/46; B07B 2220/04; Y02W 30/84
USPC ......... 198/390; 209/632, 633, 634, 660, 675
See application file for complete search history.

(56) References Cited

U.S. PATENT DOCUMENTS

| | | | | |
|---|---|---|---|---|
| 1,138,245 | A * | 5/1915 | Parsons ................... | B07B 1/12 |
| | | | | 209/675 |
| 3,556,296 | A * | 1/1971 | Buscemi, Jr. ............ | A45D 6/00 |
| | | | | 209/675 |
| 4,086,695 | A * | 5/1978 | Cornette ................. | H01M 2/24 |
| | | | | 164/DIG. 1 |

(Continued)

FOREIGN PATENT DOCUMENTS

| | | |
|---|---|---|
| JP | S6224173 A | 2/1987 |
| JP | 04155748 A | 5/1992 |

(Continued)

*Primary Examiner* — James R Bidwell
(74) *Attorney, Agent, or Firm* — Kinney & Lange, P.A.

(57) ABSTRACT

A battery aligning device includes an inlet through which a first cylindrical battery is input, an outlet from which the first cylindrical battery is discharged, regulating plates constituting a slit in a path from the inlet to the outlet, and a support member which supports one end portion and the other end portion of each of the regulating plates, in the regulating plates, a length from the one end portion to the other end portion is longer than a length of the first cylindrical battery, an X-Z cross-section has a non-linear shape, in an interval between the one regulating plate and the other regulating plate, a facing interval between surfaces is larger than a diameter of the first cylindrical battery, and when a line segment having the same length as that of the first cylindrical battery is in contact with the regulating plate at two points on the X-Z cross-section, a distance between the line segment and the regulating plate is arranged at an interval smaller than the diameter of the first cylindrical battery.

2 Claims, 3 Drawing Sheets

(56) References Cited

U.S. PATENT DOCUMENTS

| | | | | |
|---|---|---|---|---|
| 4,660,726 A | * | 4/1987 | Woode | D21B 1/023 |
| | | | | 209/396 |
| 5,077,514 A | * | 12/1991 | Tribbey | H02J 7/0013 |
| | | | | 320/107 |
| 5,431,575 A | * | 7/1995 | Engira | H01M 2/1055 |
| | | | | 429/100 |
| 2008/0237097 A1 | * | 10/2008 | Kolbe | B30B 11/08 |
| | | | | 209/655 |
| 2011/0114440 A1 | * | 5/2011 | Horniak | G07F 7/0609 |
| | | | | 194/205 |
| 2013/0320924 A1 | * | 12/2013 | Merrill | H02J 7/0042 |
| | | | | 320/110 |

FOREIGN PATENT DOCUMENTS

| | | |
|---|---|---|
| JP | 08324759 A | 12/1996 |
| JP | 2011036774 A | 2/2011 |
| JP | 2014151277 A | 8/2014 |
| JP | 2015524245 A | 8/2015 |

* cited by examiner

BATTERY ALIGNING DEVICE

CROSS-REFERENCE TO RELATED APPLICATION(S)

The present application claims the benefit of Japanese Application No. 2017-219277 filed on Nov. 14, 2017, which is incorporated by reference herein in its entirety.

BACKGROUND

Technical Field

The present invention relates to a device for aligning batteries.

Description of the Related Art

In business firms using a large number of battery-driven instruments, small-sized secondary batteries or size AA or AAA secondary batteries in most of the cases are used for driving the instruments. Thus, in order to rationally charge the large quantity of secondary batteries, a secondary battery charging device configured such that each of the secondary batteries is charged automatically is proposed. In National Publication of International Patent Application No. 2015-524245, for example, a secondary battery charging device including a hopper for accommodating a large number of secondary batteries and a rotating barrel which receives the secondary batteries accommodated in the hopper one by one in a slot and transfers them to a charging position is disclosed.

In the secondary battery charging device as described above, directions of the secondary batteries in the hopper need to be aligned so as to make them in parallel with a rotary shaft of the rotating barrel so that the slot can accommodate the secondary battery. That is, if secondary batteries which are not aligned in the direction are conveyed to each of the slots, the rotating barrel cannot transfer the secondary batteries, which could cause a failure or abnormal stop.

As a method of aligning the directions of the plurality of batteries, use of a robot arm or a conveying device can be considered. According to the conveying devices disclosed in the Japanese Patent Laid-Open No. 2011-36774 and Japanese Patent Laid-Open No. 60-161777, for example, the batteries are aligned in a predetermined direction in a conveying process of the battery by vibrating a sieve constituted by arranging a plurality of elongated rectangular plates at a predetermined interval by a power mechanism.

However, when the batteries are aligned by the robot arm, a mechanism for detecting the direction of the battery and the power mechanism relating to an arm operation are needed, and there is a concern that a rise in a size and a manufacturing cost of the device is incurred. Moreover, when the batteries are to be aligned by the conveying device, a sufficient conveyance path for the battery needs to be ensured and in addition, the power mechanism for vibrating the sieve is also needed and thus, there is also a concern that the rise in the size and the manufacturing cost of the device is incurred.

SUMMARY

The present disclosure provides a battery aligning device including an inlet through which a first cylindrical battery is input, an outlet from which the first cylindrical battery is discharged, a plurality of regulating plates constituting a slit in a path from the inlet to the outlet, and a support member which supports one end portion and another end portion of each of the plurality of regulating plates, in which the regulating plate has a length from the one end portion to the other end portion longer than the length of the first cylindrical battery, a cross-section perpendicular to a direction where the one end portion and the other end portion are connected has a non-linear shape, in an interval between one of the two regulating plates and the other regulating plate facing each other, a facing interval between the surfaces is larger than a diameter of the first cylindrical battery, and when a line segment having the same length as that of the first cylindrical battery is in contact with the one regulating plate at two points on the cross-section, a distance between the line segment and the other regulating plate is smaller than the diameter of the first cylindrical battery.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION

Embodiments of the present disclosure will be described below in detail by referring to the attached drawings.

First Embodiment

Figure 1:
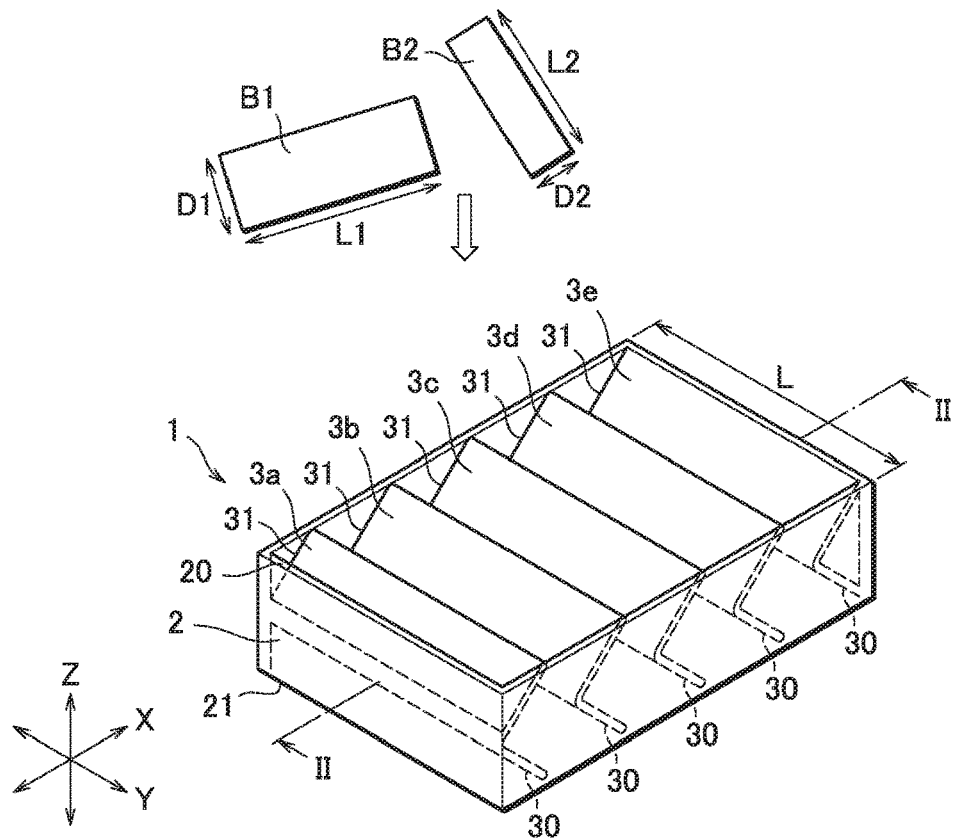
FIG. 1 is a perspective view of a battery aligning device according to a first embodiment of the present disclosure.

A battery aligning device 1 according to a first embodiment of the present disclosure will be described. FIG. 1 is a perspective view of the battery aligning device 1 according to the first embodiment. Regarding the battery aligning device 1, when a plurality of cylindrical batteries oriented in various directions is input, the directions of those cylindrical batteries are aligned and discharged. Here, in the battery aligning device 1 in this embodiment, two types of batteries, that is, a first cylindrical battery B1 and a second cylindrical battery B2 can be input.

The first cylindrical battery B1 is a size AA battery, for example, in this embodiment and has a length L1 in a longitudinal direction of 50 mm and a diameter D1 of 14.5 mm. Moreover, the second cylindrical battery B2 has a dimension smaller than that of the first cylindrical battery B1 and is a size AAA battery, for example, in this embodiment and has a length L2 in the longitudinal direction of 45 mm and a diameter D1 of 10.5 mm. Here, the battery to be input into the battery aligning device 1 may be either the first cylindrical battery B1 or the second cylindrical battery B2.

The battery aligning device 1 includes a support member 2 and a plurality of regulating plates 3a to 3e. Hereinafter, description will be made by illustrating that directions orthogonal to each other in a horizontal direction are assumed to be an X-direction and a Y-direction, respectively, and a vertical direction as a Z-direction.

The support member 2 is a frame body which surrounds four sides in the X-direction and the Y-direction by plate-shaped members in this embodiment, a region in an X-Y plane surrounded by an upper end portion 20 in the Z-direction is formed as an inlet 22, and a region in the X-Y plane surrounded by a lower end portion 21 in the Z-direction is formed as an outlet 23 (both of them are not shown in FIG. 1).

Each of the plurality of regulating plates 3a to 3e is plate-shaped member having a length L in the Y-direction, and one end portion 30 and the other end portion 31 are supported by the support member 2 from both sides in the Y-direction. Moreover, each of the regulating plates 3a to 3e has an L-shaped cross-section on an X-Z plane in this embodiment, whose details will be described later. The number of the regulating plates only needs to be plural and is not limited to the number of the regulating plates 3a to 3e, that is, five.

The support member 2 and the regulating plates 3a to 3e are formed by molding a resin in this embodiment but may be formed of other materials such as metal or wood, for example.

Here, the regulating plates 3a to 3e are formed so that the length L in the Y-direction is longer than the length L1 of the first cylindrical battery B1. Specifically, in this embodiment, the length L is set to 70 mm. Here, if the battery to be input into the battery aligning device 1 is only the second cylindrical battery B2, the length L of the battery aligning device 1 may be set longer than the length L2 of the second cylindrical battery B2.

Figure 2:
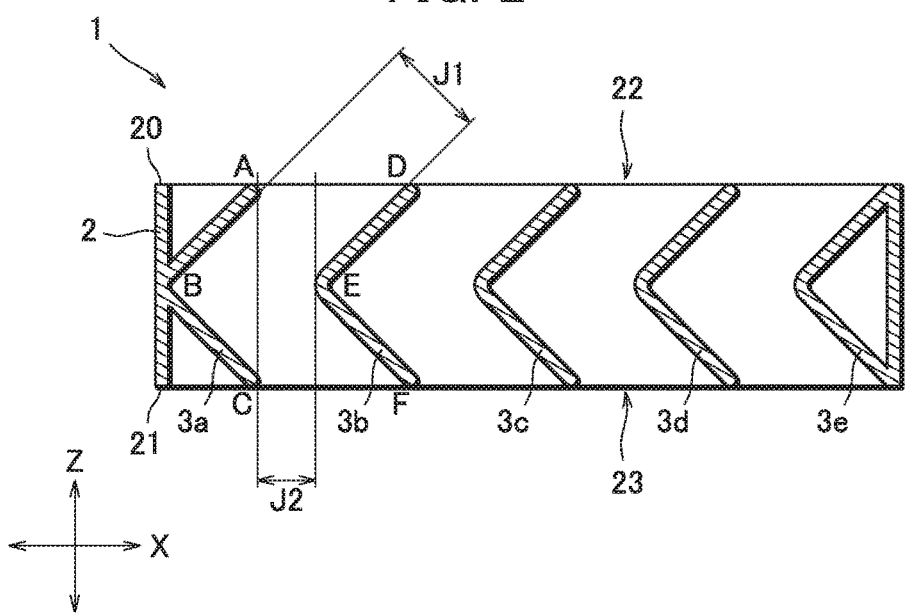
FIG. 2 is a cross-sectional view of the battery aligning device according to the first embodiment of the present disclosure.

Subsequently, the plurality of regulating plates 3a to 3e will be described in more detail. FIG. 2 is a cross-sectional view of the battery aligning device 1 according to the first embodiment. Specifically, FIG. 2 is a cross-sectional view of the X-Z plane indicated by II-II in FIG. 1 and illustrates a cross-section perpendicular to the Y-direction where the one end portion 30 and the other end portion 31 of each of the plurality of regulating plates 3a to 3e are connected.

As illustrated in FIG. 2, the regulating plates 3a to 3e are arranged at an equal interval so that the surfaces facing each other are in parallel and are separated away in the X-direction. Since each of the regulating plates 3a to 3e is arranged having the same shape and in the same direction, the regulating plate 3a and the regulating plate 3b will be described in detail herein, and detailed description for the regulating plates 3c to 3e is omitted.

The regulating plate 3a is a bent flat plate having an upstream end portion A on the inlet 22 side and a downstream end portion C on the outlet 23 side as both ends with respect to the Z-direction and having a bending point B between the upstream end portion A and the downstream end portion C and has an L-shaped cross-section in the X-Z plane, that is, a non-linear shape. The upstream end portion A and the downstream end portion C are matched with positions of the inlet 22 and the outlet 23, respectively, in this embodiment, but the inlet 22 and the outlet 23 may be at different positions, respectively, with respect to the Z-direction.

Moreover, the regulating plate 3b is a bent flat plate having an upstream end portion D on the inlet 22 side and a downstream end portion F on the outlet 23 side as both ends in the Z-direction and having a bending point E between the upstream end portion D and the downstream end portion F and has an L-shaped cross-section in the X-Z plane.

With respect to surfaces of the regulating plate 3a and the regulating plate 3b facing each other, a facing interval J1 is set larger than the diameter D1 of the first cylindrical battery B1. In more detail, a lower limit value is set to the interval between the regulating plate 3a and the regulating plate 3b so that the facing interval J1 between a straight line AB going through the upstream end portion A of the regulating plate 3a and the bending point B and a straight line DE going through the upstream end portion D of the regulating plate 3b and the bending point E is larger than the diameter D1. Specifically, in this embodiment, the facing interval J1 is set to 15 mm. As a result, the first cylindrical battery B1 and the second cylindrical battery B2 input through the inlet 22 can pass through a path from the inlet 22 to the outlet 23 if a longitudinal direction is oriented in the Y-direction.

Here, if the battery to be input into the battery aligning device 1 is only the second cylindrical battery B2, the facing interval J1 may be set to an interval larger than a diameter D2 of the second cylindrical battery B2.

Moreover, in this embodiment, since the regulating plate 3a and the regulating plate 3b are arranged by being separated from each other, a slit causing the inlet 22 and the outlet 23 to linearly communicate with each other is formed. In more detail, a slit interval J2 is formed by a straight line AC going through the upstream end portion A and the downstream end portion C of the regulating plate 3a and a straight line in parallel with the straight line AC and going through the bending point E of the regulating plate 3b.

If the slit causing the inlet 22 and the outlet 23 to linearly communicate with each other is formed, an upper limit value is set to the interval between the regulating plate 3a and the regulating plate 3b so that the slit interval J2 becomes an interval smaller than the diameter D2 of the second cylindrical battery B2. Specifically, in this embodiment, the slit interval J2 is set to 9 mm. As a result, if the longitudinal directions of the first cylindrical battery B1 and the second cylindrical battery B2 input through the inlet 22 are in the X-Z plane, the first cylindrical battery B1 and the second cylindrical battery B2 are restrained from passing through the slit interval J2.

Here, if the battery to be input into the battery aligning device 1 is only the first cylindrical battery B1, the slit interval J2 may be set to an interval smaller than the diameter D1 of the first cylindrical battery B1.

Figure 3:
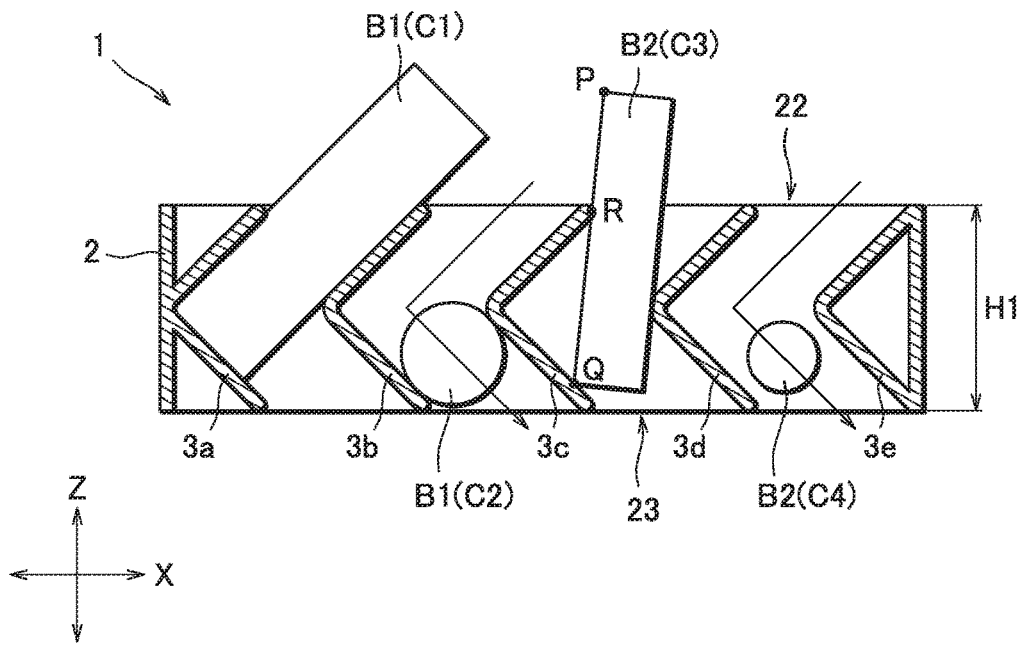
FIG. 3 is a conceptual diagram illustrating an effect of the present disclosure.

FIG. 3 is a conceptual diagram illustrating an effect of the present disclosure. In more detail, FIG. 3 is a cross-sectional view of the battery aligning device 1 schematically illustrating a difference in behaviors of the respective batteries with respect to the directions of the respective batteries when the plurality of first cylindrical batteries B1 and second cylindrical batteries B2 are input into the inlet 22.

When the longitudinal direction of the first cylindrical battery B1 is in the X-Z plane, due to the shape and arrangement of the regulating plate 3a and the regulating plate 3b as indicated by a state C1 in FIG. 3, for example, the first cylindrical battery B1 is restrained from passing through the slit. On the other hand, if the longitudinal direction of the first cylindrical battery B1 is oriented in the Y-direction, the first cylindrical battery B1 rolls between the regulating plate 3b and the regulating plate 3c and can pass through a path from the inlet 22 to the outlet 23 as indicated by a state C2 in FIG. 3, for example, and is discharged from the outlet 23.

Moreover, when the longitudinal direction of the second cylindrical battery B2 is in the X-Z plane, due to the shape and arrangement of the regulating plate 3c and the regulating plate 3d as indicated by a state C3 in FIG. 3, for example, the second cylindrical battery B2 is restrained from passing through the slit. On the other hand, if the longitudinal direction of the second cylindrical battery B2 is oriented in the Y-direction, the second cylindrical battery B2 rolls between the regulating plate 3d and the regulating plate 3e and can pass through a path from the inlet 22 to the outlet 23 as indicated by a state C4 in FIG. 3, for example, and is discharged from the outlet 23.

The first cylindrical battery B1 and the second cylindrical battery B2 brought into the state C1 and the state C3 in FIG. 3 are discharged from the outlet 23 by manually changing the direction of each of the batteries so that the states are changed to the state C2 and the state C4, respectively.

Here, a separation interval among the plurality of regulating plates 3a to 3e is set to an interval which prevents the first cylindrical battery B1 and the second cylindrical battery B2 from passing through a path from the inlet 22 to the outlet 23 while changing their longitudinal directions in the X-Z plane. More specifically, as illustrated in the state C3 in FIG. 3, for example, in the interval between the regulating plate 3c as the "one regulating plate" and the regulating plate 3d as the "other regulating plate" facing each other, when a line segment PQ having the same length as that of the second cylindrical battery B2 is in contact at two points, that is, a point Q and a point R, a distance between the line segment PQ and the regulating plate 3d is set smaller than the diameter D2 of the second cylindrical battery B2. As a result, the first cylindrical battery B1 and the second cylindrical battery B2 are prevented from passing through the path to the outlet 23 as long as their longitudinal directions are in the X-Z plane.

If the battery to be input into the battery aligning device 1 is only the first cylindrical battery B1, a distance between the line segment PQ and the regulating plate 3d may be set smaller than the diameter D1 of the first cylindrical battery B1.

Here, in each of the regulating plates 3a to 3e, a distance H1 from the upstream end portion to the downstream end portion is preferably set smaller than the length L2 of the second cylindrical battery B2. That is, if the distance H1 is smaller than the length L2, since the slit interval J2 illustrated in FIG. 2 is set smaller than the diameter D2 of the second cylindrical battery B2 as described above, conditions for preventing the first cylindrical battery B1 and the second cylindrical battery B2 from passing through the path to the outlet 23 while their longitudinal directions remain in the X-Z plane are satisfied.

As described above, the battery aligning device 1 according to the present disclosure includes the plurality of regulating plates 3a to 3e in the path from the inlet 22 to the outlet 23, and the cross-section in the X-Z plane has a non-linear shape. Moreover, the battery aligning device 1 is arranged such that the facing interval J1 between the surfaces of the plurality of facing regulating plates 3a to 3e is larger than the diameter of the first cylindrical battery B1, and the slit interval J2 is smaller than the diameter of the second cylindrical battery B2.

As a result, in the battery aligning device 1, if the direction of the longitudinal direction of the input battery is in the X-Z plane, the battery is restrained from passing through the path to the outlet 23, while if it is in the Y-direction, the battery is discharged from the outlet 23. Thus, the battery aligning device 1 can discharge the battery in the predetermined direction even if the plurality of batteries that is not aligned in the direction is input.

Then, the battery aligning device 1 does not need any of a mechanism for detecting the direction of the battery, a power mechanism, and a conveying device including a conveyance path, and the plurality of input batteries passes through the path to the outlet 23 by its own weight and moreover, it has configuration that does not include a power mechanism or a mechanism or the like which may cause a failure. Therefore, according to the present disclosure, a small-sized and inexpensive battery aligning device can be provided.

Second Embodiment

A battery aligning device 4 according to a second embodiment of the present disclosure will be described. Regarding the battery aligning device 4, similarly to the battery aligning device 1 according to the aforementioned first embodiment, when the plurality of first cylindrical batteries B1 and second cylindrical batteries B2 oriented in various directions is input, the battery aligning device 4 aligns those cylindrical batteries and then, discharges them.

Figure 4:
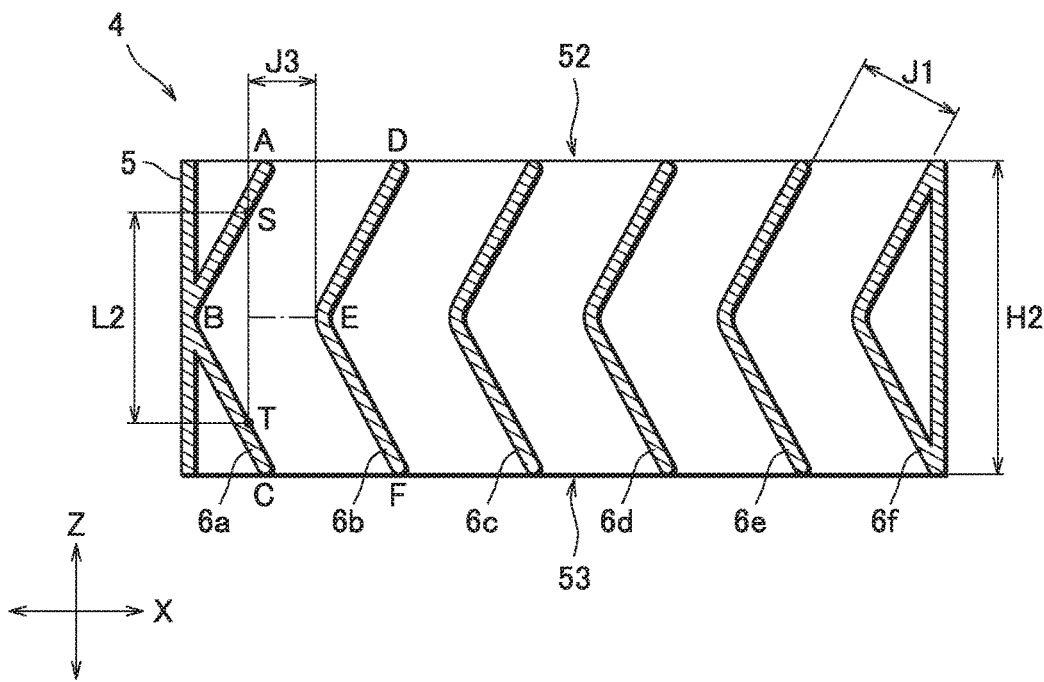
FIG. 4 is a cross-sectional view of the battery aligning device according to a second embodiment of the present disclosure.

FIG. 4 is a cross-sectional view of the battery aligning device 4 according to the second embodiment of the present disclosure. The battery aligning device 4 includes a support member 5 and a plurality of regulating plates 6a to 6f, both having distances in the Z-direction of H2. Here, the plurality of regulating plates 6a to 6f has L-shaped cross-sections in the X-Z plane, but the bending angle is an obtuse angle. Moreover, the distance H2 of the plurality of regulating plates 6a to 6f in the Z-direction is longer than the length L2 of the second cylindrical battery B2.

Moreover, the facing interval J1 between the facing surfaces of the plurality of regulating plates 6a to 6f is set to an interval larger than the diameter D1 of the first cylindrical battery B1 similarly to the aforementioned first embodiment. As a result, when the longitudinal directions of the first cylindrical battery B1 and the second cylindrical battery B2 input through an inlet 52 are oriented in the Y-direction, they can pass through a path from the inlet 52 to an outlet 53.

On the other hand, a separation interval among the plurality of regulating plates 6a to 6f is set to an interval which prevents the first cylindrical battery B1 and the second cylindrical battery B2 from passing through the path from the inlet 52 to the outlet 53 while changing their longitudinal directions in the X-Z plane. More specifically, as illustrated in FIG. 4, for example, in the interval between the regulating plate 6a as the "one regulating plate" and the regulating plate 6b as the "other regulating plate" facing each other, when a line segment ST having the same length as that of the second cylindrical battery B2 is in contact at two points, that is, a point S and a point T, a distance J3 between the line segment ST and the regulating plate 6b is set smaller than the diameter D2 of the second cylindrical battery B2. As a result, the first cylindrical battery B1 and the second cylindrical battery B2 are prevented from passing through the path to the outlet 23 as long as their longitudinal directions is in the X-Z plane.

As a result, according to the battery aligning device 4 according to this embodiment, a small-sized and inexpensive battery aligning device can be provided similarly to the battery aligning device 1 according to the first embodiment of the present disclosure described above. Moreover, according to the battery aligning device 4 according to this embodiment, since the bending angle of the regulating plates 6a to 6f can be made an obtuse angle, even if there is a limit on a dimension in the X-direction, the number of paths from the inlet 52 to the outlet 53 can be increased within a range of the limit.

Figure 5:
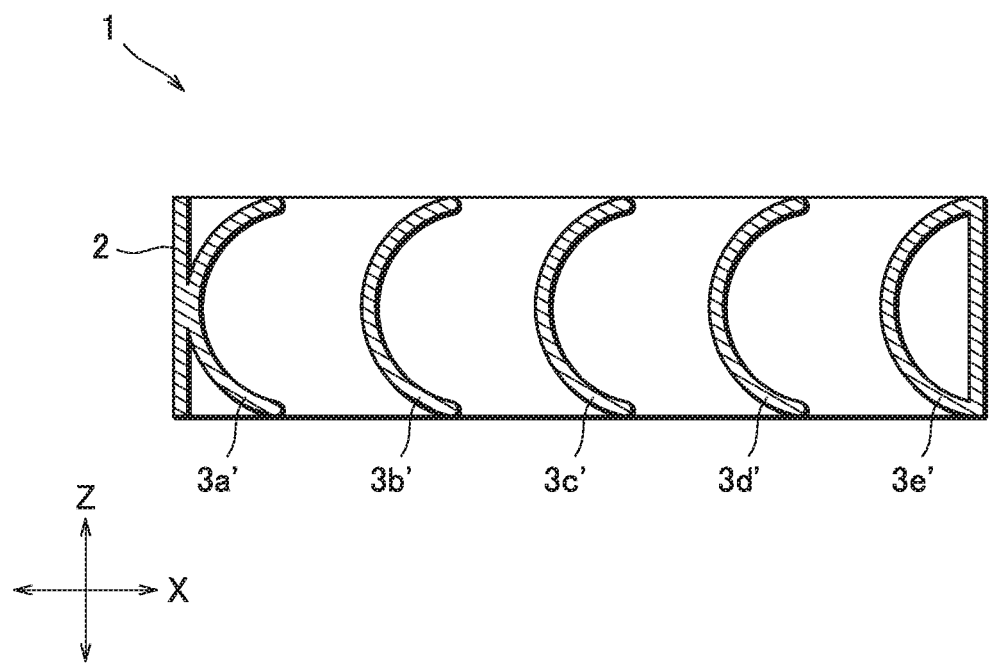
FIG. 5 is a cross-sectional view of the battery aligning device according to a variation of the present disclosure.

The description of the embodiments have been completed as above, but the present disclosure is not limited to the aforementioned embodiments. In the aforementioned first embodiment, for example, the cross-sectional shape of each of the plurality of regulating plates 3a to 3e in the X-Z plane has an L-shape but it may be a C-shape as the plurality of regulating plates 3a' to 3e' illustrated in FIG. 5. Moreover, in the aforementioned first embodiment, the plurality of regulating plates 3a to 3e has a vertically symmetric shape with respect to the Z-direction, but they may have a vertically asymmetric shape.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

<First Aspect of the Present Disclosure>

A first aspect of the present disclosure is a battery aligning device which includes an inlet through which a first cylindrical battery is input, an outlet from which the first cylindrical battery is discharged, a plurality of regulating plates constituting a slit in a path from the inlet to the outlet, and a support member which supports one end portion and another end portion of each of the plurality of regulating plates, in which the regulating plate has a length from the one end portion to the other end portion longer than the length of the first cylindrical battery, a cross-section perpendicular to a direction where the one end portion and the other end portion are connected has a non-linear shape, in an interval between one of the two regulating plates and the other regulating plate facing each other, a facing interval between the surfaces is larger than a diameter of the first cylindrical battery, and when a line segment having the same length as that of the first cylindrical battery is in contact with the one regulating plate at two points on the cross-section, a distance between the line segment and the other regulating plate is smaller than the diameter of the first cylindrical battery.

The plurality of regulating plates included in the battery aligning device has the one end portions and the other end portions supported by the support member from the both sides, has a cross-section perpendicular to a supporting direction with a non-linear shape, and constitutes a slit in the path from the inlet to the outlet. Here, in the plurality of regulating plates, since the facing interval between the facing surfaces is set larger than the diameter of the first cylindrical battery, if the direction of the longitudinal direction of the input first cylindrical battery is in parallel with the supporting direction, the first cylindrical battery can be discharged from the outlet.

Moreover, when the line segment having the same length as that of the first cylindrical battery is in contact with the one regulating plate at two points on the cross-section perpendicular to the supporting direction, the plurality of regulating plates is arranged at such interval that the distance between the line segment and the other regulating plate is smaller than the diameter of the first cylindrical battery. Thus, when the direction of the longitudinal direction of the first cylindrical battery is not in parallel with the supporting direction, even if the direction is changed on the cross-section perpendicular to the supporting direction, the first cylindrical battery cannot pass through the interval between the plurality of regulating plates, and the first cylindrical battery is restrained from passing through the path to the outlet.

As a result, even if the plurality of non-aligned first cylindrical batteries is input, the battery aligning device can prevent the plurality of first cylindrical batteries from being discharged with the directions being not aligned, and the directions of the plurality of input first cylindrical batteries can be aligned. Then, the battery aligning device does not need any of a mechanism for detecting a direction of the battery, a power mechanism, and a conveying device including a conveyance path. Therefore, according to the first aspect of the present disclosure, a working effect that a small-sized and inexpensive battery aligning device can be provided is obtained.

<Second Aspect of the Present Disclosure>

A second aspect of the present disclosure is, in the aforementioned first aspect of the present disclosure, a battery aligning device in which, in the interval between the one regulating plate and the other regulating plate, when a line segment having the same length as that of the second cylindrical battery having a dimension smaller than that of the first cylindrical battery is in contact with the one regulating plate at two points on the cross-section, the distance between the line segment and the other regulating plate is smaller than a diameter of the second cylindrical battery.

With respect to the plurality of regulating plates included in the battery aligning device, the facing interval between the facing surfaces is set larger than the diameter of the first cylindrical battery and thus, if the longitudinal directions of the input first cylindrical battery and second cylindrical battery are in parallel with the supporting direction, the first cylindrical battery and the second cylindrical battery can be discharged from the outlet.

Moreover, when the line segment having the same length as that of the second cylindrical battery is in contact with the one regulating plate at two points on the cross-section perpendicular to the supporting direction, the plurality of regulating plates is arranged at such interval that the distance between the line segment and the other regulating plate is smaller than the diameter of the second cylindrical battery. Thus, when the longitudinal directions of the first cylindrical battery and the second cylindrical battery are not in parallel with the supporting direction, even if their directions are changed on the cross-section perpendicular to the supporting direction, the first cylindrical battery and the second cylindrical battery cannot pass through the interval between the plurality of regulating plates, and are restrained from passing through the path to the outlet.

As a result, even if the plurality of non-aligned first cylindrical batteries and second cylindrical batteries is input in a mixed manner, the battery aligning device can prevent the plurality of first cylindrical batteries and second cylindrical batteries from being discharged with the directions being not aligned, and the directions of the plurality of input first cylindrical batteries and second cylindrical batteries can be aligned. Then, the battery aligning device 1 does not need any of a mechanism for detecting a direction of the battery, a power mechanism, and a conveying device including a conveyance path. Therefore, according to the second aspect of the present disclosure, a working effect that a small-sized and inexpensive battery aligning device can be provided is obtained.

What is claimed is:

1. A battery aligning device comprising:
an inlet through which a first cylindrical battery is input;

an outlet from which the first cylindrical battery is discharged;

a plurality of regulating plates constituting a slit in a path from the inlet to the outlet; and a support member which supports a first end portion and a second end portion of each of the plurality of regulating plates, wherein:

in the regulating plate, a length from the first end portion to the second end portion is longer than a length of the first cylindrical battery, and a cross-section perpendicular to a direction where the first end portion and the second end portion are connected has a non-linear shape;

in an interval between a first regulating plate and a second regulating place facing each other of the plurality of regulating places, a facing interval of surfaces thereof is larger than a diameter of the first cylindrical battery; and a first line segment having a length equal to the length of the first cylindrical battery, positioned in contact with the first regulating plate at two points on the cross-section, results in a distance between the first line segment and the second regulating plate being smaller than the diameter of the first cylindrical battery.

2. The battery aligning device according to claim 1, wherein:

in the interval between the first regulating plate and the second regulating plate, a second line segment having a length equal to a length of a second cylindrical battery having a dimension smaller than that of the first cylindrical battery, positioned in contact with the first regulating plate at two points on the cross-section, results in a distance between the second line segment and the second regulating plate being smaller than a diameter of the second cylindrical battery.

* * * * *